Figure 1:
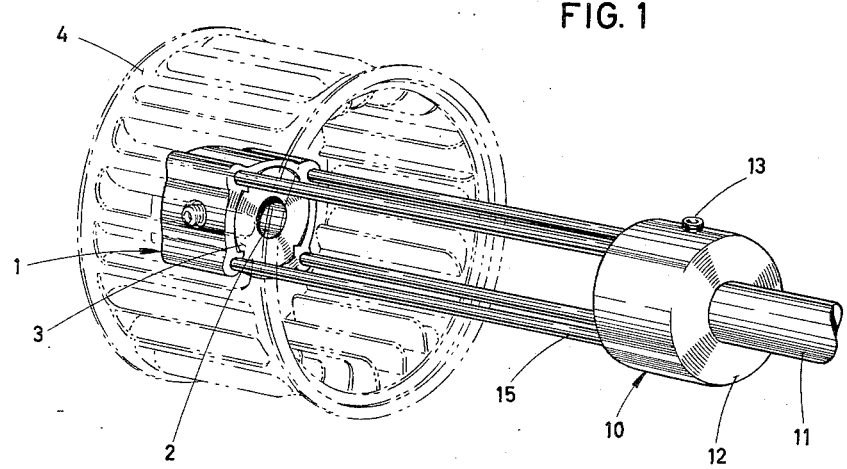

June 12, 1962      K. O. L. WALLMAN      3,038,323

ELASTIC COUPLING PARTICULARLY FOR OIL BURNERS

Filed Nov. 1, 1960

3,038,323
ELASTIC COUPLING PARTICULARLY
FOR OIL BURNERS
Knut Olof Lennart Wallman, Hejdegatan 26,
Linkoping, Sweden
Filed Nov. 1, 1960, Ser. No. 66,628
Claims priority, application Sweden Nov. 4, 1959
5 Claims. (Cl. 64—27)

The present invention relates to an elastic coupling particularly for oil burners, for transmitting torque between a driving means, e.g. an impeller of an oil burner, and a driven means, such as the pump shaft of the oil burner, axially spaced from and substantially coaxial with said driving means.

At oil burners it is suitable, for reason of security, to connect the oil pump with the impeller of the burner via an elastic coupling so that the oil pump is prevented from discharging oil to the fire-place in case the impeller would loosen from the driving engine. Such couplings comprise usually two end parts of metal which are arranged to be secured to the pump shaft respectively to the hub of the impeller and which are connected to one another through a part of rubber or similar soft material which is inserted into the end parts. This rubber part is difficult to center and to balance dynamically and will therefore easily be set in swinging motion during operation which causes noise and wear in the coupling.

One object of the invention is therefore to provide in an elastic coupling of the above character coupling means which elastically connects the driving means with the driven means in centered and dynamically balanced relation and which coupling means in its movements is free from play so that the coupling will be silent in operation and will have a long length of life.

Another object of the invention is to provide in an elastic coupling as above a connection between a coupling member and a shaft or hub in the coupling, of such a nature that the coupling member is constrained against rotation on the shaft or the hub but is axially displaceable thereon simultaneously as the connection between the coupling member and the shaft or hub will be free from play which causes noise and wear of the coupling.

A further object is to provide such a coupling member which can be applied to the shaft or the hub without the need of machining the coupling member and the shaft respectively the hub, and without the use of any separate locking means or the like, whereby the coupling will be non-expensive to manufacture and simple to assemble and disassemble.

A further object is to provide in such a coupling lengthwise extending coupling rods and at least one coupling member of such a kind that one end of the rods can be easily connected and disconnected with the coupling member so as to facilitate mounting of the rods and exchange of them for rods of other lengths.

A further object is to provide a coupling member in which the coupling rods are yieldingly attached to decrease strains in the rods arising at starting the coupling.

With the above and other objects in view, which will appear as the description proceeds, this invention resides in the novel construction combination and arrangements of parts substantially as hereinafter described and more particularly defined by the appended claims, it being understood that such changes in the precise embodiment of the herein disclosed invention may be made as come within the scope of the claims.

Figure 2:
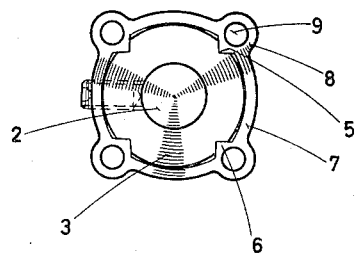
Figure 3:
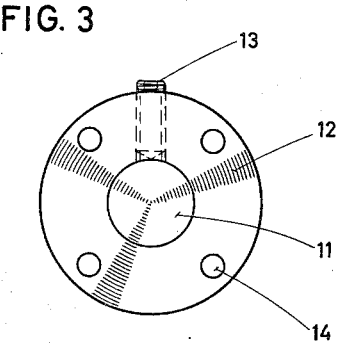
Figure 4:
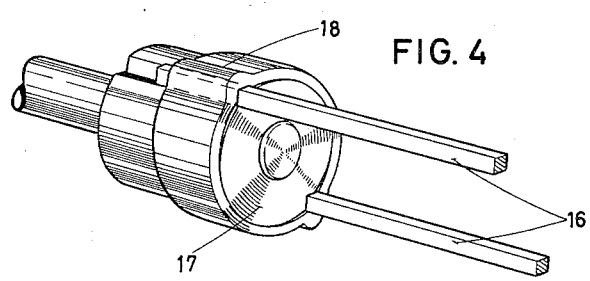

The accompanying drawing illustrates two complete examples of the physical embodiments of the invention constructed according to the best modes so far devised for the practical application of the principles thereof, and in which:

FIG. 1 is a perspective view of the elastic coupling.
FIG. 2 is an end view of the driving means seen from the driven means.
FIG. 3 is an end view of the driven means seen from the driving means.
FIG. 4 is a perspective view of a modified embodiment of the elastic coupling.

On the drawing the numeral 1 designates a driving means which consists of a motor shaft end 2 and a hub 3 of a centrifugal fan blower 4 which is secured to the shaft end by means of a screw. The hub 3 is cylindrically shaped having its circumference intersected by longitudinally extending grooves 5 which are wedged shaped in cross section and the surfaces of which serve as torque reaction surfaces.

In cooperation with the grooves 5 there are wedged shaped longitudinal ribs 6 which are formed on a sleeve 7 in a cylindrical opening therein. The sleeve 7 is made, preferably moulded, of elastically deformable material such as plastic. The cylindrical opening has a diameter which substantially corresponds to the diameter of the hub 3 so that the sleeve can be passed onto the hub. The cross section of the ribs is, however, somewhat larger than the cross section of the grooves 5 so that the ribs, when the sleeve is passed onto the hub, are forced radially outwardly through wedge action. The deformation of the sleeve causes an elastic tensioning of the material in the wall of the sleeve so that the sleeve is tightened around the hub between the ribs. The force of the tightening will depend on the elasticity of the material and the size of the opening in relation to the cross section of the hub. Thus if the material has a small elasticity and the sleeve substantially fits on the hub and the ribs are arranged to exert a large radially force on the sleeve this will be clamped to a very hard engagement with the hub. Obviously the tightening force between the sleeve and the hub will decrease if the material is more elastic and the sleeve and the ribs are so dimensioned in relation to the hub and the grooves therein that the ribs exert a smaller radial force on the sleeve, but still the connection between the sleeve and the hub will be without such play as causes motion therebetween, since the surfaces of the ribs are still in secure engagement with the surfaces of the grooves and these surfaces transmit the torque. By this the invention also enables to procure a sleeve which is axially displaceable on the hub simultaneously as the sleeve is constrained against rotation and has no play which can cause motion between the sleeve and the hub when in operation.

The deformable sleeve is further formed with a number of lengthwise extending wall bulges 8, each of which is formed on the outer side of the sleeve radially opposite to each of the ribs, so that the wall of the sleeve together with the bulges and the ribs form enlarged wall parts. In each of the wall parts is made a hole, which holes are parallel with each other and the axis of rotation of the coupling and symmetrically arranged, i.e. on equal distance from each other along a circle coaxial with said axis of rotation.

At the other end of the elastic coupling there is a driven means 10, comprising a shaft end 11 which projects from the oil pump of the burner, and a sleeve 12 which is made of metal or another hard material and attached to the shaft end 11 by a screw 13. In the sleeve 12 are made axially extending holes 14 located opposite the holes 9 in the driving means and arranged in the same way as the holes 9. The coupling comprises further a number of rods 15 of spring steel or similar elastic material. The rods have their ends inserted into the holes 9 and 14 and form together with the sleeves 7 and 12 a lightweighted but strong mechanical unit, the structure of which is such that the coupling will be dynamically balanced without taking any additional steps therefor and the two ends of the coupling will properly center. The rods are preferably rigidly attached in the sleeve 12, e.g. by jolting the material of the end of the sleeve adjacent the holes 14. The other ends of the rods are detachably driven into the holes 9, so that the coupling when desired can be easily disassembled. It will be seen that an elastic connection between the sleeve and the rod is provided, whereby strains in the rods arising when starting the coupling are reduced.

When a torque is transmitted from the hub to the pump shaft the rods will be somewhat bent in peripherical direction on account of the free part of the rods being large in relation to their cross section. By this working absorption in the rods a rapid starting of the fan blower or another sudden load change will not be transferred as a jerk to the shaft but the torque will, as desired, be flexibly transmitted to the pump. The elastic deformation arising in the wall parts 8 at the start contributes also to the flexibility of the coupling as above described.

In spite of the sleeves 7 and 12 are attached firmly and without play the rods 15 will not be subjected to any axial forces if the free distance between the hub 3 and the pump shaft 11 would be changed, e.g. by thermal expansion when the oil burner is in operation. Such a longitudinal expansion will viz. be compensated by carrying out the sleeve 7 such as that it can move along the hub as previously described.

On account of the material of the sleeve being elastically deformable the coupling is useful also in the case the pump shaft 11 would not be fully centered or it would be distorted in relation to the hub 3 since such an excentricity or distortion is compensated at the rotation in that the ends of the rods 15 which are driven into the sleeve 7 together with the wall parts 8 are individually flexible in radial direction.

The coupling according to the modified embodiment shown in FIG. 4 comprises two flexible rods 16 having quadrangular cross section. A hub 17 which can be the driving or the driven means is provided with torque reaction surfaces which form two symmetrically located V-shaped grooves. The hub is surrounded by an elastic sleeve 18 which internally is formed with two longitudinally extending grooves, preferably V-shaped in cross section. Into the square formed spaces formed by the grooves of the hub and the grooves of the sleeve when located opposite to each other the rods 16 are inserted and held in engagement with the hub by the clamping force exerted on the rods by the sleeve. Also in this embodiment the connection between the coupling and the hub will be without play with respect to motion therebetween, and by suitable dimensioning the parts the rods can simultaneously be made axially displaceable.

It will be observed that the cooperating surfaces on hub and on the sleeve by which the sleeve is forced outwardly when it is passed on the hub, can be shaped in different ways to obtain the effect desired.

I claim:

1. Elastic coupling preferably for oil burners, for transmitting torque between a driving means, e.g. an impeller of an oil burner, and a driven means, such as the pump shaft of the oil burner, axially spaced from and substantially coaxial with said driving means; comprising: a shaft end part on one of said means; torque reaction surfaces extending longitudinally of said end shaft part, so that its circumference surface is intersected by said reaction surfaces; an elastically deformable sleeve adapted to be passed on the shaft end part; internal torque reaction surfaces in said sleeve arranged to cooperate with said reaction surfaces on the shaft end part to deform the sleeve so that the sleeve is tightened to engagement with the shaft end part; yieldable rods connected to said sleeve and to the other of said means and substantially parallel to the axis of rotation of the coupling to form an elastic connection between said driving and said driven means.

2. Elastic coupling, preferably for oil burners for transmitting torque between a driving means, e.g. an impeller of an oil burner, and a driven means, such as the pump shaft of the oil burner, axially spaced from and substantially coaxial with said driving means; comprising: a round shaft end part on one of said means; grooves which are made in the circumference surface of said shaft end part lengthwise thereof and which grooves are wedged shaped in cross section; an elastically deformable sleeve having an internal diameter substantially fitting that of the shaft end part and adapted to be passed thereon; internal wedge shaped ribs formed along the sleeve, which ribs are adapted to cooperate with the grooves in the shaft end part to guide the sleeve on said end part and which ribs have a somewhat larger cross section than that of said grooves so that a wedge action is obtained in passing the sleeve onto the shaft end part to deform the sleeve and thereby tighten it to engagement around the shaft end part; and yieldable rods connected to said sleeve and to the other of said means and substantially parallel to the axis of rotation of the coupling to form an elastic connection between said driving and said driven means.

3. Elastic coupling according to claim 2, further characterised in that the elastically deformable sleeve comprises a number of lengthwise extending wall bulges, each of which is formed on the outer side of the sleeve radially opposite to each of said ribs, so that the wall of said sleeve together with said bulges and said ribs form enlarged wall parts each of which resiliently receives the end of a corresponding rod arranged to be driven into the wall part through a hole therein, while the wall of the sleeve between said enlarged wall parts will have a less thickness to facilitate its deformation to engagement with the shaft end part in passing the sleeve thereon.

4. Elastic coupling according to claim 2, further characterised in that the ribs are bevelled at one end to facilitate the introduction of the ribs into the grooves.

5. Elastic coupling preferably for oil burners, for transmitting torque between a driving means, e.g. an impeller of an oil burner, and a driven means, such as the pump shaft of the oil burner, axially spaced from and substantially coaxial with said driving means; comprising: a shaft end part on one of said means; guide surfaces extending longitudinally of said end shaft part, so that its circumference surface is intersected thereby; an elastically deformable sleeve adapted to be passed on the shaft end part; internal guide surfaces extending longitudinally of said sleeve; elastic bars arranged to be inserted between said shaft end part and said sleeve to engagement with said guide surfaces to deform the sleeve to tightening engagement with the shaft end part and the bars; said bars being connected to the other of said means and substantially parallel to the axis of rotation of the coupling to form a yieldable connection between said driving and said driven means.

References Cited in the file of this patent

UNITED STATES PATENTS

| 1,640,670 | Schaeffer | Aug. 30, 1927 |
| 2,696,719 | Sklar | Dec. 14, 1954 |

FOREIGN PATENTS

| 389,907 | Great Britain | Mar. 30, 1933 |